United States Patent Office 3,384,099
Patented May 21, 1968

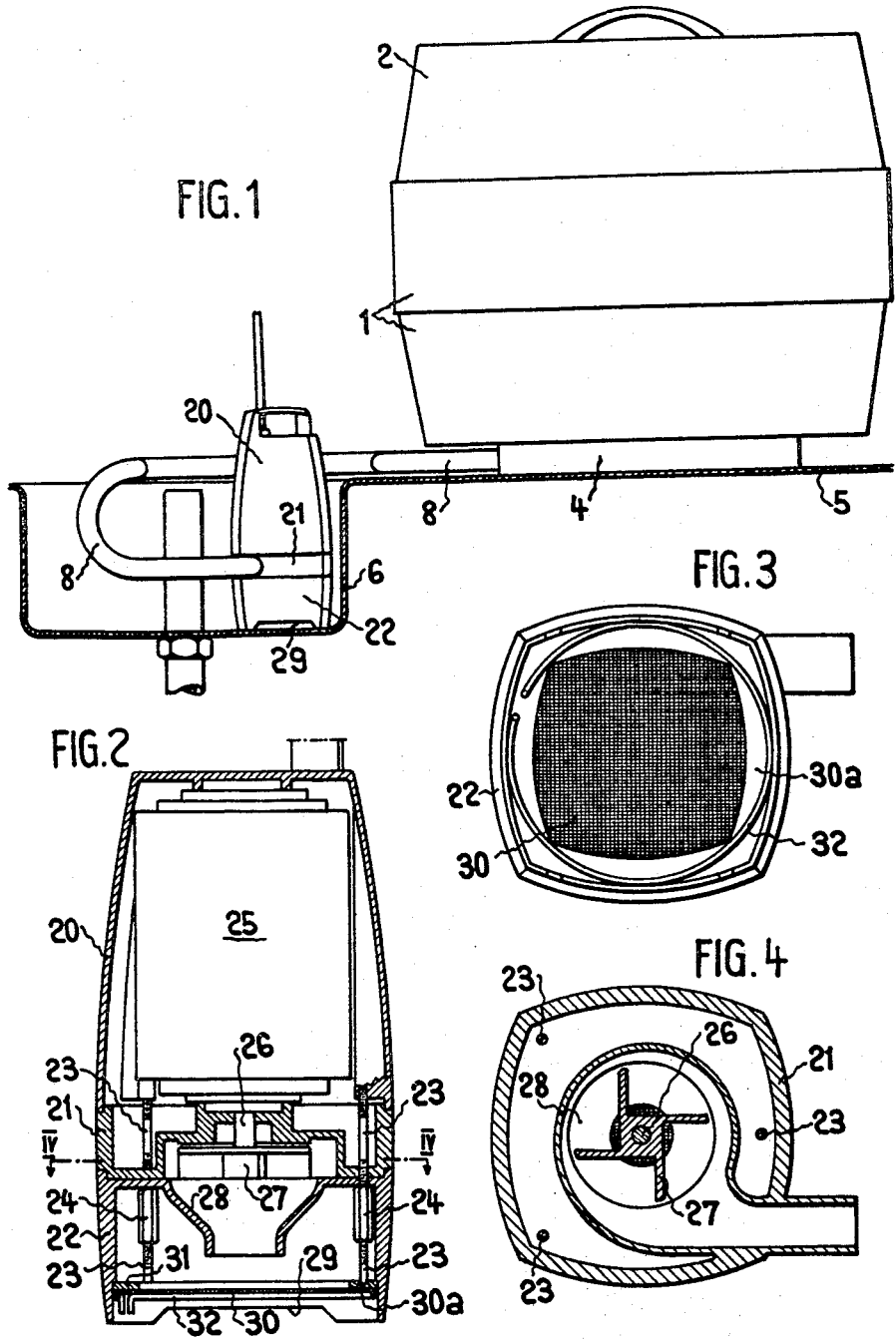

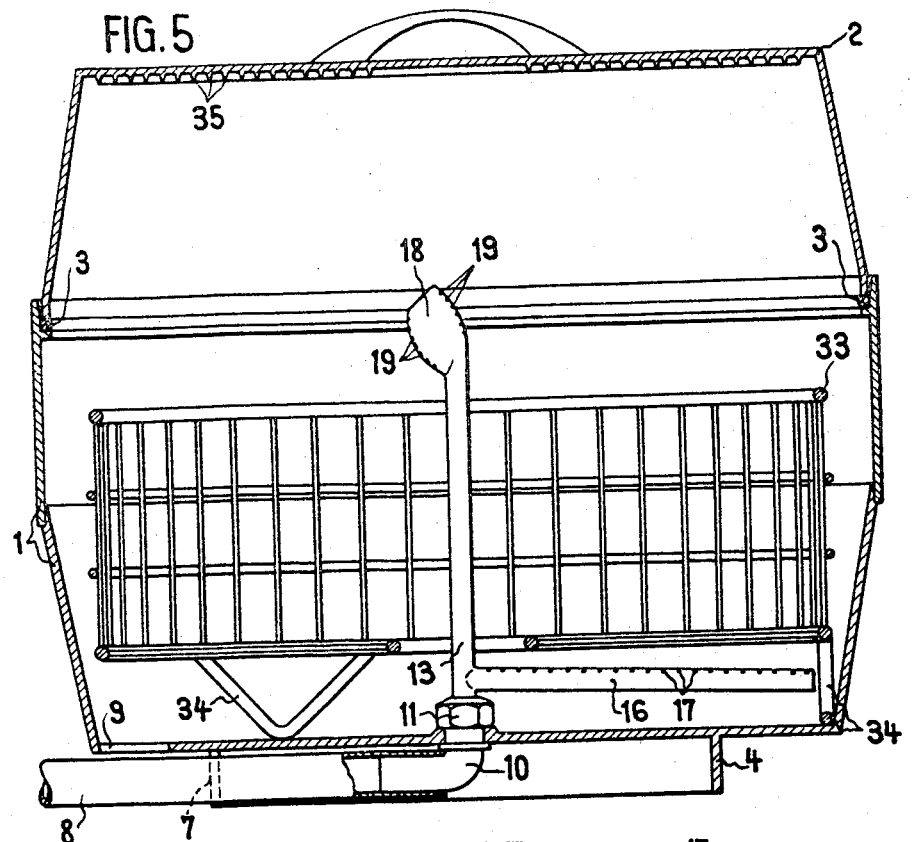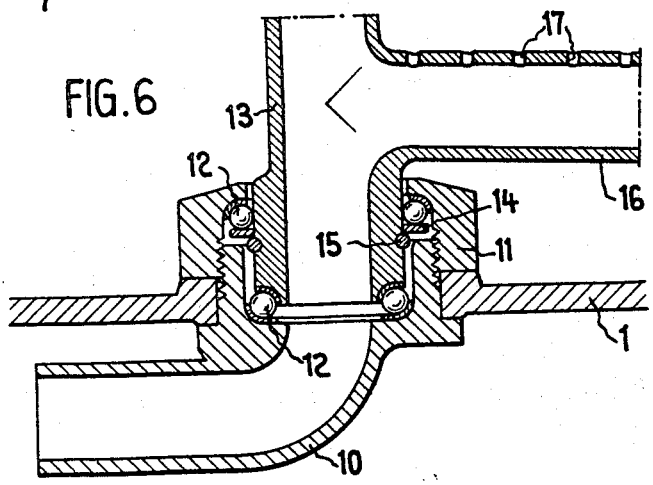
INVENTOR.
Willi Baumann

3,384,099
HAND-PORTABLE DISH-WASHING APPLIANCE
Willi Baumann, Sternenstrasse 7, Herzogenbuchsee, Switzerland
Filed Oct. 12, 1965, Ser. No. 495,067
1 Claim. (Cl. 134—115)

ABSTRACT OF THE DISCLOSURE

A hand-portable dish-washing appliance having a casing adapted to be placed on a drainage board of a sink and means for pumping washing water prepared in the sink for spraying it over dishes contained in said casing.

This invention relates to an appliance for washing dishes, vessels or the like objects.

Prior dish washing machines usually comprise a container for washing liquid, pump means for circulating the liquid and sprinkling it over the objects to be washed and heating means for the washing liquid. All these elements together with a number of auxiliary equipment are assembled in a fixed relation in a casing. Washing machines of this type which are mostly used for dish washing are expensive and heavy and require considerable space which is often not available. It is impossible to remove the washing machine when the place occupied by it is wanted for any other purpose.

In view of the above drawbacks, another type of washing appliances has been suggested having no liquid container and no pump and wherein the spraying device is connected to an existing hot-water tap, the hot water being immediately drained from the casing of the machine. Although this type of washing appliance is of simple, cheap and light construction, it has a number of heavy drawbacks. It consumes an excessive quantity of hot water which is insufficiently used. If soap has to be added to the water, complicated systems are required for continuously and regularly admitting soap into the inlet tube connected to the hot-water tap.

It is the object of this invention to provide a novel simple inexpensive and light washing appliance avoiding the above drawbacks and adapted for use with any existing washing installation. The washing operation according to this invention broadly comprises preparing the washing liquid in a container apart from any automatic washing appliance, providing circulating means including a pump and spraying means, connecting said circulating means to said container and repeatedly circulating said washing liquid from said container through said spraying means and over the goods to be washed and back to the container. With this operation, the necessary quantity of washing liquid with any required addition of washing agent or the like may be prepared in any existing container but preferably in an existing sink combined with a drainage board. The hot-water consumption is thus reduced to a quantity substantially corresponding to the quantity used for washing the same objects by hand. The washing appliance required for circulating and spraying the washing liquid may be removed from the drainage board and sink after use.

The washing appliance for carrying out the above operation broadly comprises a protecting casing open at its lower end and adapted for being placed on any existing support, spraying means for washing liquid in said casing, a flexible inlet pipe connected to said spraying means and extending from said casing, pump means in said inlet pipe, the end of said inlet pipe spaced from said casing being adapted to be dipped into a quantity of washing liquid contained in any existing container. The flexible inlet pipe of sufficient length allows the use of the appliance under various conditions and for various relative positions of the container and the support for the casing. While the pump and pump motor may be located on the casing it is preferred to provide a submersible pump and pump motor connected to the end of the inlet pipe spaced from the casing.

Further objects, features and advantages of the invention will be apparent from the following description of an embodiment of a dish washing appliance according to the invention illustrated in the attached drawing therein FIG. 1 is a general side view of the dish washing appliance, FIG. 2 is an axial section of the pump of the appliance, FIG. 3 is a bottom view of the pump, FIG. 4 is a section along line IV—IV in FIG. 2, FIG. 5 is a vertical section of the casing, and FIG. 6 is a section of the bearing of the sprinkling device on an enlarged scale.

The dish washing appliance comprises a casing having a lower casing portion 1 and a cover 2. The cover is removably supported on a sealing ring 3 and an annular shoulder of the casing portion 1. The bottom of the casing portion 1 has an annular flange 4 forming a base for supporting the casing on any suitable supporting structure, preferably on the drainage board 5 combined with a sink 6 of an existing installation for dish washing by hand. The flange 4 of the casing portion 1 has a gap 7 for passage of a flexible inlet pipe 8. Above the gap 7 the casing portion 1 has an outlet opening 9.

The inlet tube 8 is connected to a connection piece 10 fixed in a central bore of the bottom of the casing portion 1 by means of a counter nut 11. The connection piece 10 and the nut 11 form the outer races for balls 12 of two ball bearings for a rotatable sprinkler 13. The balls 12 of the upper bearing are axially supported on a race 14 secured by a spring ring 15 which also forms a sealing for reducing the liquid loss through the bearing. The sprinkler has an arm 16 with a row of outlet apertures 17. The sprinkler also has an inclined head 18 having two opposite rows of outlet apertures 19.

The end of the inlet tube 8 spaced from the casing portion 1 is connected to an immersible pump-and-motor assembly shown in FIGS. 1 to 4. The assembly has a water tight casing made of three portions 20, 21 and 22 interconnected by bolts 23 and nuts 24. The upper portion encloses an electric motor 25. The motor shaft 26 extending downwardly from the motor casing carries an impeller 27 of a centrifugal pump. The middle portion 21 of the casing forms the spiral casing of the pump with the outlet pipe as shown in FIG. 4. The lower portion 22 of the casing forms an inlet pipe 28 of the pump. This lower portion 22 forming the base or foot of the assembly has recesses 29 through which water may be sucked in towards the inlet tube of the pump when the assembly stands on the bottom of the sink 6. A strainer 30 having a reinforcing rim portion 30a is removably seated on a disc 31 supported on a shoulder of the casing portion 22. The strainer 30 is secured by means of a spring ring 32 and may easily be replaced when it is contaminated.

The casing 1, 2 includes a basket 33 for supporting vessel not shown in the drawing. The basket has three feet 34. The basket may be removed from the casing and may be used outside the washing appliance as a container for vessel. Two baskets may preferably be provided serving for different types of vessel, for instance one basket for breakfast and one basket for dinner vessel, and the baskets may be used for transport of the vessel from the washing appliance to the table and vice versa.

The cover portion 2 of the casing has annular ribs 35 at its inner top surface for reflecting washing liquid sprinkled towards the top surface onto the objects contained in the basket.

Use and operation of the washing appliance are as follows: When the objects to be washed have been inserted into the basket within the casing or the basket containing the objects has been inserted into the casing and the cover 2 has been applied, washing liquid is mixed in the sink 6 as would be done for washing the objects by hand. Washing agent may be added to the water and the temperature may be adjusted as desired. When the required quantity of washing liquid has been prepared in the sink 6 the pump assembly is put into the sink as shown in FIG. 1 and the motor is started. The washing liquid is now pumped through the inlet pipe 8 into the sprinkler and is sprinkled through the apertures 17 and 19 onto the objects contained in the basket. The jets leaving apertures 17 are not directed parallel to the axis of the sprinkler but are inclined to one side so that sprinkler 13 starts to rotate and all the objects contained in the basket are uniformly washed. The washing liquid is drained from the casing through opening 9 and flows back into the sink 6 over the drainage board 5. The same quantity of washing liquid is thus repeatedly circulated and used for washing the objects. The duration of the washing operation may be chosen as desired in accordance with the contamination of the objects to be washed.

For termination of the washing operation the washing liquid is drained from the sink 6 and the pump is stopped. Washing liquid contained in the inlet tube 8 flows back through the pump and is also drained from the sink. The strainer 30 is now removed and cleaned or thrown away and the cleaned strainer or a new one is applied to the pump inlet. Rinsing water is then prepared in the sink 6 and the pump is started for circulating this rinsing water over the objects. Relatively hot rinsing water may be used and it has been found that the objects will dry completely without the use of hot air when sufficiently hot rinsing water is used and when the cover 2 is removed from the casing after rinsing. When the rinsing water has been drained from the sink 6 and the pump has been stopped the pump-motor assembly may be removed from the sink. It is also possible to remove the casing 1, 2 and the pump-motor assembly from the drainage board 5 which is thus available for other purposes.

During the washing and rinsing operation, big objects such as pans, bottles, jugs and objects with particularly resistant contaminations may be washed and rinsed by hand in the sink 6.

What I claim is:
1. A hand-portable dish-washing appliance comprising, in combination,
   a casing having a side wall defining an open top and having a bottom wall provided with a drainage outlet,
   a basket for holding articles to be washed, said basket having an open top and a bottom provided with a central opening,
   support means for supporting said basket with its bottom spaced above said bottom wall of the casing,
   a cover for closing said open top of the casing,
   spray means for spraying washing liquid simultaneously through the bottom of said basket and through the open top thereof for impingement upon articles contained in the basket, said spray means including a vertical arm projecting through said opening in the bottom of the basket and extending to a point above the top of the basket, a spray head on the upper end of said vertical arm and means rotatably mounting the lower end of the vertical leg on said bottom wall of the casing, a lateral arm joined with said vertical arm and extending substantially horizontally therefrom between the bottom of the basket and said bottom wall of the casing, said lateral arm having a length approximately equal to the radius of said bottom of the basket and being provided with openings therein for directing washing liquid in upwardly inclined direction so that the vertical arm is rotated about its axis and said lateral arm sweeps beneath the basket as the washing liquid is expelled,
   and pump means for supplying washing liquid to said spray means, said pump means comprising a portable pump adapted to be placed in a pool of washing liquid remote from said casing and having a flexible discharge conduit connected to said spray means.

References Cited
UNITED STATES PATENTS

| | | | |
|---|---|---|---|
| 2,218,869 | 10/1940 | Bilde | 134—176 |
| 2,320,133 | 5/1943 | Horwitz | 134—179 |
| 3,130,676 | 4/1964 | Beaulieu | 134—169 X |
| 3,158,160 | 11/1964 | Estandian | 137—176 X |

FOREIGN PATENTS

| | | |
|---|---|---|
| 287,728 | 3/1928 | Great Britain. |
| 607,778 | 9/1948 | Great Britain. |
| 668,181 | 3/1942 | Great Britain. |

ROBERT L. BLEUTGE, *Primary Examiner.*

CHARLES A. WILMUTH, *Examiner.*